Oct. 26, 1926.  
J. H. BRITTON  
CALIPER  
Filed August 17, 1925  
1,604,876  
2 Sheets-Sheet 1
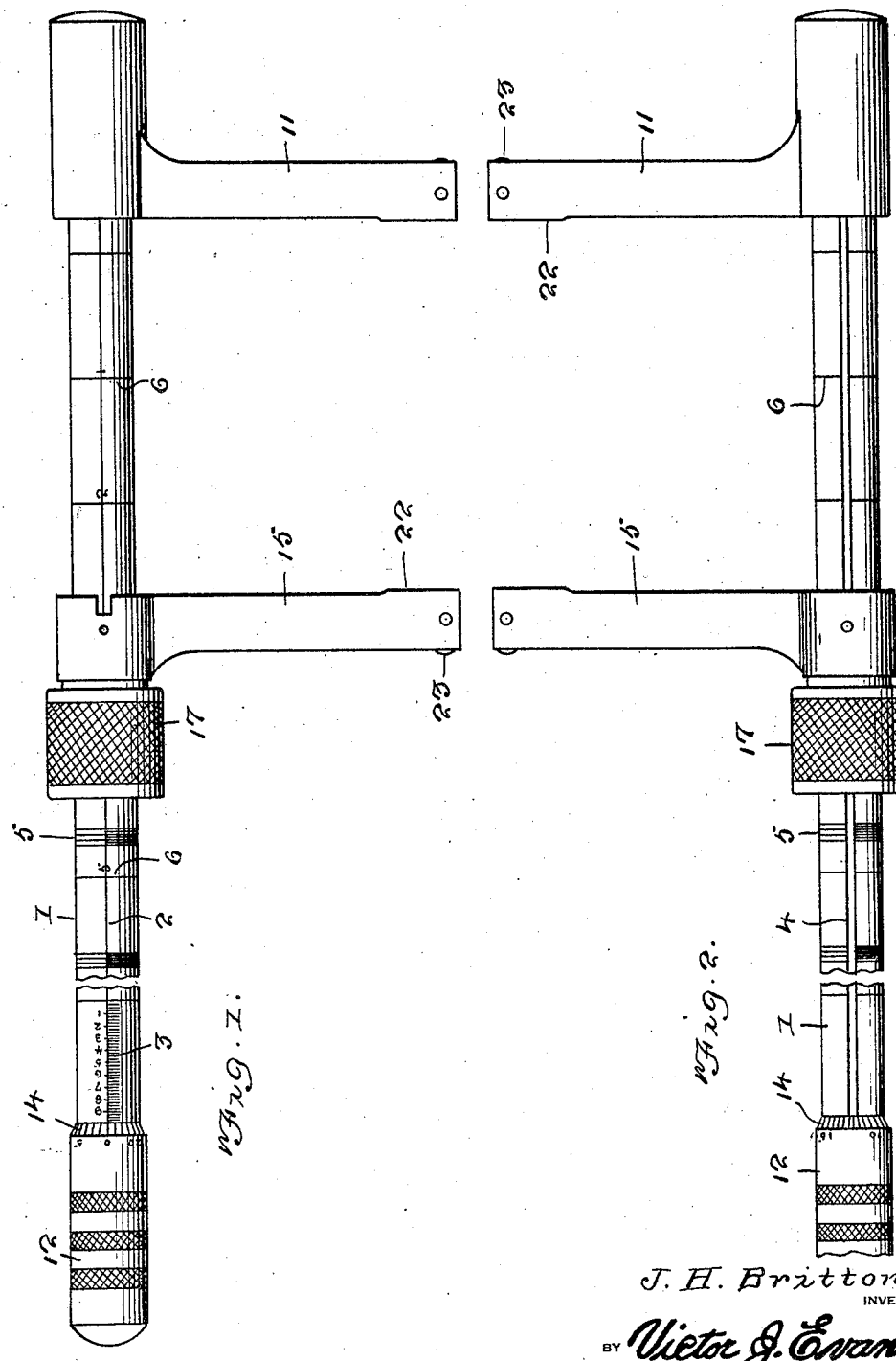
J. H. Britton
INVENTOR
BY Victor J. Evans
ATTORNEY Oct. 26, 1926.
J. H. BRITTON
CALIPER
Filed August 17, 1925   2 Sheets-Sheet 2
1,604,876
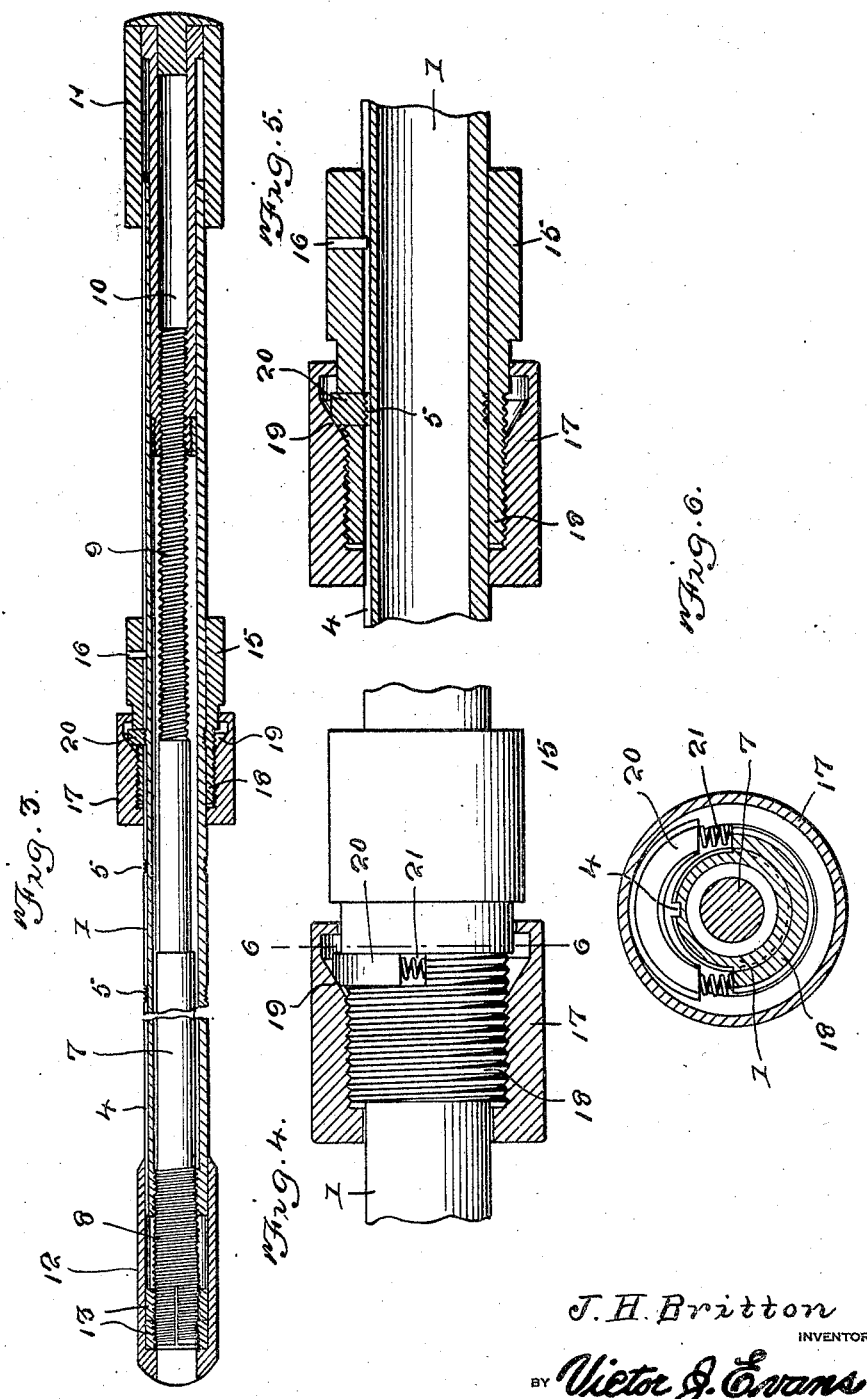

Patented Oct. 26, 1926.

1,604,876

UNITED STATES PATENT OFFICE.

JAMES H. BRITTON, OF ABERDEEN, MARYLAND.

CALIPER.

Application filed August 17, 1925. Serial No. 50,767.

This invention relates to improvements in calipers, the general object of the invention being to provide a device of this nature which can be used for external and internal measurements, and the adjustments of which can be quickly and accurately made, and the parts of which are subject to but little wear.

Another object of the invention is to make the device self-containing, so that there is no substitution of parts and there is no danger of dirt and dust getting between the parts and rendering the same inactive.

A further object of the invention is to provide a tubular member upon one end of which the thimble or handle slides and through which a shaft passes, which is connected with the thimble and which has threaded engagement with one end of the tubular member and with a part of one of the jaws, the threads being so arranged that the thimble and jaw will move toward or away from each other, as the thimble is turned in one direction or the other, this arrangement doing away with end thrust washers, screws, lock nuts and the like.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Figure 2 is a similar view, but looking toward the opposite side.

Figure 3 is a longitudinal sectional view.

Figure 4 is an enlarged sectional view showing the adjusting means for the inner jaw.

Figure 5 is a similar view, with the adjusting means in operative position.

Figure 6 is a section on line 6—6 of Figure 4.

In these views, 1 indicates a tubular member which is provided with the longitudinally extending line 2 and the graduations or scale 3. It is provided with the longitudinally extending groove 4 and the threaded parts 5 which are spaced an inch apart. It is also provided with the inch marks 6 which extend around the member. A shaft 7 fits within the tubular member and has a threaded part 8 which engages the threaded rear end of the tubular member and the threaded part 9 which engages the internal threads of a tubular extension 10 of the outer jaw 11 which has its tubular head fitting over the front end of the member 1. The thimble or handle 12 is fastened to the shaft by the nuts 13 and it laps the graduated end of the member 1, the inner end of the thimble being beveled and provided with the graduations 14 which cooperate with the scale 3 on the member 1. The inner jaw 15 has its tubular head sliding on the member 1, and said head carries a pin 16 which engages the groove 4 in the member 1. A nut 17 engages the threaded extension 18 of the head of the jaw 15 and said nut has an internal beveled part 19 for engaging a spring pressed sectional nut 20 to force the same downwardly into engagement with one of the threaded parts 5 to lock the jaw 15 in adjusted position. When the nut 17 is retracted, the springs 21 of the nut member 20 will raise the same out of engagement with the threaded part 5, so that the jaw 15 can be adjusted on the member 1. These threaded parts 5 are cut as a continuous thread so that when the nut member 20 engages one of these parts 5, the jaw 15 is accurately set for said part 20 cannot be pressed downwardly into engagement with the part 5, unless the threads of the two parts are in registry. Each jaw is provided with a flat face 22 for external measurements, and a rounded projection 23 on its opposite face for internal measurements. The threads 9 are preferably twice the pitch of the threads 8 and, as will be seen, when the thimble or handle 12 is turned in one direction, it will uncover portions of the scale 3, as it will move rearwardly on the member 1 said member being held stationary and at the same time the jaw 11 will move outwardly away from the jaw 15. When the thimble is turned in an opposite direction, it will move inwardly, as will the jaw 11, the graduations 3 and 14 indicating the extent of the movement of the jaw. As the thimble 12 is turned, the shaft 7 will also be turned and as the member 1 is held stationary by being grasped by one hand, said shaft 7 will be moved longitudinally in the member 1, due to its threaded engagement with said member, and this movement of the shaft will tend to move the jaw 11 with it, but as the threaded part 9 of the shaft engages the threaded extension 10 of the jaw 11 and said threads are of twice the pitch of the threads 8, the movement imparted to member 10 and jaw 11 by the threads will more than offset the longitudinal movement of the shaft 7 and thus the jaw 11 will move in an opposite direction from that of the thimble 12. I prefer to make the threads 8 of forty pitch and the threads 9 of twenty pitch. The jaw 15 is adjusted by inches and is locked in adjusted position through means of the threaded parts 5, the nut member 20 and the nut 17.

As will be seen, the construction of this tool eliminates the use of thrust washers, screws, lock nuts and the like and their constant wear and adjustment, and as the tool is self-contained, there is no substitution of parts, with the possibility of dirt getting between the parts and affecting the accuracy of the measurements. By placing the registering thimble on the tubular member instead of the sliding jaw, internal measurements can be taken from one inch up, and external measurements from zero to the limit of the length of the tool. By a simple movement of the nut 17, the jaw 15 is unlocked and can be adjusted to the desired inch mark and then locked by another turning movement of the nut 17 so that the adjustment of this jaw 15 can be made very quickly. This tool can be used to do all the accurate measurements in a garage, tool shop and the like, as it can be used for measuring cylinder bores, the diameter of pistons or pins and the like. It can be used for duplicating measurements, as the parts can be locked in adjusted position and wear can be taken up by means of the nuts 13.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described, comprising a tubular member having one end threaded, a shaft arranged in the member and having a threaded end projecting therefrom, portions of the threaded part engaging the threads of the tubular member, a thimble connected with the projecting end of the shaft and lapping the end of the tubular member, there being graduations on said thimble and tubular member said shaft having a second threaded portion thereon of greater pitch than the first threaded portion, a jaw slidably mounted on the tubular member and having an extension extending into the same, said extension being threaded to receive the second threaded portion of the shaft and a second jaw adjustably mounted on the tubular member.

2. A device of the class described, comprising a tubular member having one end threaded, a shaft arranged in the member and having a threaded end projecting therefrom, portions of the threaded part engaging the threads of the tubular member, a thimble connected with the projecting end of the shaft and lapping the end of the tubular member, there being graduations on said thimble and tubular member said shaft having a second threaded portion, the threads of which are of greater pitch than the first threaded portion, a jaw slidably mounted on the tubular member and having an extension extending into the same, said extension being threaded to receive the second threaded portion of the shaft, and a second jaw adjustably mounted on the tubular member, each jaw having a flat face for engaging exterior surfaces and a rounded projection on another face for engaging interior surfaces.

3. A device of the class described, comprising a tubular member having one end threaded, a shaft arranged in the member and having a threaded end projecting therefrom, portions of the threaded part engaging the threads of the tubular member, a thimble connected with the projecting end of the shaft and lapping the end of the tubular member, there being graduations on said thimble and tubular member said shaft having a second threaded portion, the threads of which are of greater pitch than the first threaded portion, a jaw slidably mounted on the tubular member and having an extension extending into the same, said extension being threaded to receive the second threaded portion of the shaft, a second jaw adjustably mounted on the tubular member, and means for locking the second jaw in adjusted position.

4. A device of the class described, comprising a tubular member having one end threaded, a shaft arranged in the member and having a threaded end projecting therefrom, portions of the threaded part engaging the threads of the tubular member, a thimble connected with the projecting end of the shaft and lapping the end of the tubular member, there being graduations on said thimble and tubular member said shaft having a second threaded portion, the threads of which are of greater pitch than the first threaded portion, a jaw slidably mounted on the tubular member and having an extension extending into the same, said extension being threaded to receive the second threaded portion of the shaft, a second jaw adjustably mounted on the tubular member, means for locking the second jaw in adjusted position, such means comprising a spring pressed nut member on the jaw threaded to engage threads formed at intervals on the tubular member and a nut member connected with a threaded part of the jaw and having a part for pressing the spring pressed nut member into engagement with one of the threaded parts of the tubular member.

5. A device of the class described, comprising a tubular member internally threaded at one end and having exterior threads at spaced intervals with a longitudinally extending groove in its exterior, a jaw having a tubular part engaging the tubular member, a key in the tubular part engaging the groove in the member, a spring actuated threaded member for engaging the threaded parts on the exterior of the tubular member, a nut member associated with the tubular part of the jaw for pressing the spring actuated member into engagement with the threaded part of the tubular member, a second jaw having a tubular part engaging one end of the tubular member, a threaded extension on the tubular part extending into the tubular member, a shaft having threaded portions at its ends, the threads of different pitch, with one set of threads engaging the threaded extension of the second jaw and the other set engaging the internal threads of the tubular member, a thimble connected with the projecting end of the shaft and overlapping the tubular member and there being graduations on the overlapping end and on the tubular member.

In testimony whereof I affix my signature.

JAMES H. BRITTON.